(12) United States Patent
Kondo

(10) Patent No.: US 10,473,266 B2
(45) Date of Patent: Nov. 12, 2019

(54) HIGH-PRESSURE TANK

(71) Applicant: TOYOTA JIDOSHA KABUSHIKI KAISHA, Toyota-shi, Aichi (JP)

(72) Inventor: Toshiyuki Kondo, Chiryu (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 15/877,473

(22) Filed: Jan. 23, 2018

(65) Prior Publication Data
US 2018/0259124 A1    Sep. 13, 2018

(30) Foreign Application Priority Data

Mar. 9, 2017   (JP) ................................. 2017-045421

(51) Int. Cl.
*F17C 1/04*      (2006.01)
*F17C 13/04*     (2006.01)
*F17C 1/00*      (2006.01)

(52) U.S. Cl.
CPC .................. *F17C 1/04* (2013.01); *F17C 1/00* (2013.01); *F17C 13/04* (2013.01);
(Continued)

(58) Field of Classification Search
CPC .... F17C 1/04; F17C 13/04; F17C 2201/0109; F17C 2260/01; F17C 1/06; F17C 1/02; F17C 13/00; F17C 2203/0604; F17C 2203/0663; F17C 2205/0176; F17C 2265/032; F17C 2270/0142;
(Continued)

(56) References Cited

U.S. PATENT DOCUMENTS 4,736,779 A * 4/1988 Bernauer ............. C01B 3/0005
141/4
6,742,554 B1 * 6/2004 Immel ...................... F17C 1/00
137/264
(Continued)

FOREIGN PATENT DOCUMENTS

JP        2004293784 A      10/2004
JP        2008151280 A       7/2008
(Continued)

*Primary Examiner* — Robert J Hicks
*Assistant Examiner* — Matusala K Tewolde
(74) *Attorney, Agent, or Firm* — Dickinson Wright, PLLC

(57) ABSTRACT

A high-pressure tank in which a liner can be formed using the conventionally used material, a decrease in the volumetric efficiency within the liner can be suppressed, and influence of a temperature rise due to adiabatic compression on the liner can be significantly alleviated. The tank includes a liner that suppresses permeation of gas; a valve device that allows the inside of the liner and the outside of the tank to communicate with each other and blocks communication therebetween; and an inner container with a through-hole disposed within the liner such that a gap is formed between the inner container and an inner periphery of the liner. The first communication channel of the valve device connects with a pipe extending in the gap and having holes therein. Gas supplied to the valve device is supplied into the gap from the holes in the pipe, and fills the inner container in a high-pressure state from the gap through the through-hole in the inner container.

4 Claims, 5 Drawing Sheets

(52) U.S. Cl.
CPC ............... *F17C 2201/0109* (2013.01); *F17C 2201/056* (2013.01); *F17C 2201/058* (2013.01); *F17C 2203/0604* (2013.01); *F17C 2203/0663* (2013.01); *F17C 2205/0305* (2013.01); *F17C 2205/0397* (2013.01); *F17C 2221/012* (2013.01); *F17C 2223/0123* (2013.01); *F17C 2223/036* (2013.01); *F17C 2260/01* (2013.01); *F17C 2260/037* (2013.01); *F17C 2270/0184* (2013.01); *Y02E 60/321* (2013.01); *Y02E 60/324* (2013.01)

(58) Field of Classification Search
CPC .......... F17C 2265/061; F17C 2265/065; F17C 2203/0621; F17C 2203/0602; F17C 2203/0624; F17C 2203/0619; F17C 2203/0391; F17C 3/08; F17C 3/085; F17C 1/00; F17C 2223/00; B65D 23/02; B65D 25/14; B65D 25/16; F16K 1/34; B64D 37/00; B60K 15/0406
USPC ....... 220/586, 589, 588, 62.21, 62.22, 62.11, 220/203.19, 203.02, 203.01, 581; 429/FOR. 110, FOR. 132; 206/0.6; 251/118, 205, 206, 339, 340
See application file for complete search history.

(56) References Cited

U.S. PATENT DOCUMENTS

| | | | | |
|---|---|---|---|---|
| 7,172,825 | B2* | 2/2007 | Adams | F16K 24/04 |
| | | | | 215/3 |
| 8,435,700 | B2* | 5/2013 | Okawachi | F17C 1/06 |
| | | | | 220/586 |
| 2009/0142636 | A1* | 6/2009 | Handa | F17C 1/06 |
| | | | | 429/413 |
| 2014/0166671 | A1* | 6/2014 | Downie | F17C 5/02 |
| | | | | 220/581 |
| 2017/0175951 | A1* | 6/2017 | Morgan | F17C 1/06 |
| 2018/0119882 | A1* | 5/2018 | Allidieres | F17C 5/007 |
| 2019/0024845 | A1* | 1/2019 | Criel | B01D 19/0005 |

FOREIGN PATENT DOCUMENTS

| | | |
|---|---|---|
| JP | 2008232243 A | 10/2008 |
| JP | 2014020440 A | 2/2014 |

* cited by examiner

HIGH-PRESSURE TANK

CROSS REFERENCE TO RELATED APPLICATIONS

The present application claims priority from Japanese patent application JP 2017-045421 filed on Mar. 9, 2017, the content of which is hereby incorporated by reference into this application.

BACKGROUND

Technical Field

The present disclosure relates to a high-pressure tank for storing gas in a high-pressure state therein.

Background Art

High-pressure tanks for storing gas in a high-pressure state therein are known. In addition, fuel-cell cars having mounted thereon high-pressure hydrogen gas tanks, which store hydrogen gas as fuel gas in a high-pressure state therein, are also known.

Usually, this type of high-pressure tank includes, as described in JP 2008-232243 A, for example, a liner that serves the function of a barrier layer to suppress permeation of gas to be stored in the tank, a fiber-reinforced resin layer for securing the strength of the high-pressure tank by covering the outer periphery of the liner, and a valve device that supplies gas into the liner and discharges gas from the liner to the destination of the gas when the gas is used.

When the interior of the liner is rapidly filled with gas via the valve device, the gas undergoes adiabatic compression within the liner and generates heat. The generated heat increases the temperature of the liner. Due to such temperature rise, there is a possibility that the constituent members of the high-pressure tank, in particular, the liner may become damaged. Therefore, for a fuel-cell car having mounted thereon a high-pressure hydrogen gas tank that stores hydrogen gas as fuel gas therein, there has been taken a measure to prevent a temperature rise within the high-pressure hydrogen gas tank to a level above a given temperature, for example, 85° C., when the tank is filled with hydrogen gas.

One example of such a measure is cooling (precooling) hydrogen gas before it fills the tank to a low temperature of about −40° C. As another example, there has also been proposed a measure to suppress a temperature rise in a high-pressure hydrogen gas tank upon occurrence of adiabatic compression. The latter example is described in JP 2014-020440 A or JP 2008-151280 A, for example.

In the high-pressure tank described in JP 2014-020440 A, a liner made of resin is used as the liner, and thermally conductive fillers are mixed in the resin so that the thermal conductivity of the liner in the thickness direction becomes greater than or equal to 1 W/mK and less than 10 W/mK. In the high-pressure tank of JP 2008-151280 A, a gas storage container having a long liner is provided with, in the interior of the liner, a gas exhaust pipe for discharging gas, a collision member for causing gas discharged from the gas exhaust pipe to collide therewith, and a heat radiation member for transferring heat from the collision member or a heat-absorbing material for absorbing heat from the collision member.

SUMMARY

The means described in JP 2014-020440 A requires, for producing a tank, a new process of mixing thermally conductive fillers in resin that forms a liner. In the high-pressure tank described in JP 2008-151280 A, a collision member for causing gas discharged from the gas exhaust pipe to collide therewith as well as a heat radiation member or a heat-absorbing material for heat from the collision member is required to be disposed within the liner. Therefore, the configuration becomes complex and the volume efficiency within the liner decreases.

The present disclosure has been made in view of the foregoing, and exemplary embodiments relate to providing a high-pressure tank in which a liner can be formed using the conventionally used material decrease in the volumetric efficiency within the liner can be suppressed, and influence of a temperature rise due to adiabatic compression on the liner can be significantly alleviated.

A high-pressure tank in accordance with the present disclosure includes at least a liner adapted to suppress permeation of gas; a valve device adapted to allow an inside of the liner and an outside of the tank to communicate with each other and block communication therebetween; an inner container disposed within the liner such that a gap is formed between the inner container and an inner periphery of the liner; and a through-hole formed in the inner container. The valve device includes a first communication channel through which the gap formed between the liner and the inner container communicates with the outside of the tank, and through which gas is supplied to the gap from the outside of the tank, and a second communication channel through which an inside of the inner container communicates with the outside of the tank, and through which gas is discharged to the outside of the tank from inside of the inner container.

In an embodiment of the high-pressure tank, the through-hole formed in the inner container is formed in a region lower than a center of the inner container in a vertical direction.

In another embodiment of the high-pressure tank, the first communication channel of the valve device connects with a pipe extending in the gap formed between the liner and the inner container, and the pipe has a plurality of holes therein. In such an embodiment, the pipe is preferably located at a top in a vertical direction of the liner.

In an embodiment of the high-pressure tank, the gas is hydrogen gas. In addition, in an embodiment, the liner and the inner container contain an identical material. Preferably, the identical material is a resin material.

According to the present disclosure, a high-pressure tank can be obtained in which a liner can be formed using the conventionally used material a decrease in the volumetric efficiency within the liner can be suppressed, and direct influence of heat generated due to adiabatic compression of gas filling the tank on the liner can be significantly alleviated. Therefore, it becomes easier to maintain the liner at a temperature of less than or equal to the desired preset temperature, and avoid deterioration of the liner by heat. At same time, it becomes also possible to increase the temperature (precool temperature) of hydrogen gas before it fills the tank, and reduce the operating cost on the external high-pressure gas station side.

DETAILED DESCRIPTION

Hereinafter, several embodiments of a high-pressure tank in accordance with the present disclosure will be described.

First Embodiment

Figure 1:
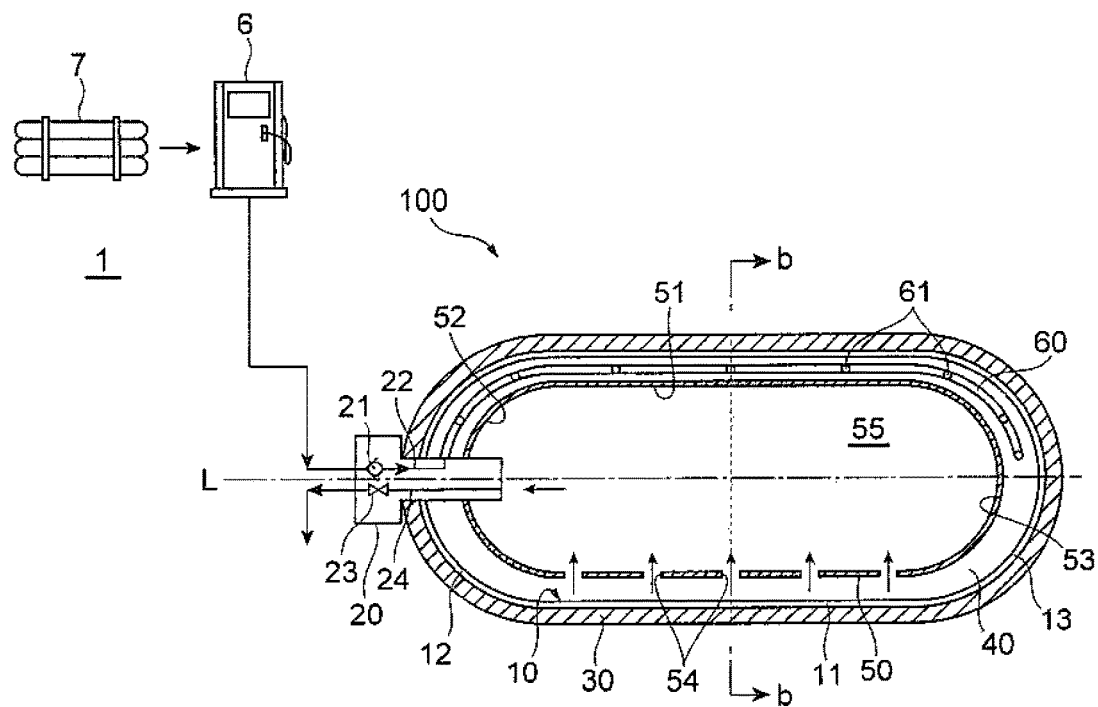
FIG. 1 is a view of an embodiment of a high-pressure tank in accordance with the present disclosure.
Figure 2:
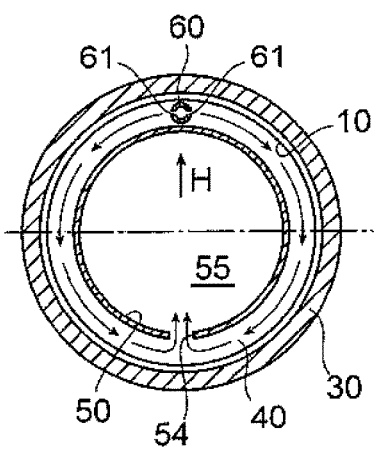
FIG. 2 is a cross-sectional view along line b-b of FIG. 1.

FIG. 1 is a view of a first embodiment of a high-pressure tank in accordance with the present disclosure. Specifically, FIG. 1 is a cross-sectional view along the central axis line, and FIG. 2 is a cross-sectional view along a direction orthogonal to the central axis line, that is, a cross-sectional view along line b-b of FIG. 1.

The high-pressure tank 100 has a liner 10 made of a material through which gas stored in the tank does not permeate. The liner 10 includes a cylindrical body 11, a first dome portion 12 in a hemispherical shape integrally formed with one end of the body 11, and a second dome portion 13 in a hemispherical shape integrally formed with the other end of the body 11. A valve device 20 is attached to the center of the first dome portion 12. The material of the liner 10 may be either a metallic material or a resin material.

The valve device 20 is adapted to allow the inside of the liner 10 and the outside of the tank to communicate with each other or block the communication therebetween, and is integrally formed within a mouthpiece (not shown). The valve device 20 includes a first communication channel 22 with a check valve 21 and a second communication channel 24 with an on-off valve 23.

The liner 10 has a fiber-reinforced resin layer 30 formed on its outer periphery through film winding. The fiber-reinforced resin layer 30 has a function of reinforcing the liner 10 to improve the mechanical strength, such as the rigidity and pressure resistance, of the high-pressure tank 100. The fiber-reinforced resin layer 30 is formed of thermosetting resin and reinforcing fiber bundles. As the thermosetting resin, it is preferable to use thermosetting resin, such as phenol resin, melamine resin, urea resin, or epoxy resin in particular, from the aspect of increasing the mechanical strength, epoxy resin is preferably used. As the reinforcing fibers, glass fibers, aramid fibers, boron fibers, carbon fibers, or the like can be used.

It should be noted that the aforementioned configuration of the high-pressure tank 100 may be the same configuration of the conventional high-pressure tank described in JP 2008-232243 A.

The high-pressure tank 100 in accordance with this embodiment further includes an inner container 50 disposed within the liner 10 such that a gap 40 is formed between the inner container 50 and the inner periphery of the liner 10. The inner container 50 is not particularly limited, but is preferably the one with a similar shape to that of the liner 10 and with a size slightly reduced from that of the liner 10 in the three-dimensional direction. The inner container 50 includes a body 51, a first dome portion 52 in a hemispherical shape integrally formed with one end of the body 51, and a second dome portion 53 in a hemispherical shape integrally formed with the other end of the body 51. The valve device 20 is attached to the center of the first dome portion 52. Further, an appropriate number of through-holes 54 are formed in the lowermost portion of the inner container 50 in the vertical direction when the high-pressure tank 100 is laid on its side.

The material for forming the inner container 50 may be either the same material as or a different material from that of the liner 10 under the condition that it is a material through which gas stored in the high-pressure tank 100 does not permeate. As described below, the inner container 50 serves the function of a temperature partition wall between gas at a high temperature within the inner container 50 and gas outside the inner container 50 that is at a lower temperature than the gas within the inner container 50, that is, gas located in the gap 40 and the function of an adiabatic wall for preventing the temperature of the high-temperature gas within the inner container 50 from being easily transferred to the liner 10. In addition, since the inside and the outside of the inner container 50 are almost at the same pressure when the tank is filled with gas and when the tank stores gas therein, the inner container 50 need not have a reinforced function. It is acceptable as long as the inner container 50 has a thin-plate structure that has a thickness enough to retain its shape and will not deform due to a high temperature generated within the inner container 50. It should be noted that as described above, such a high temperature generated within the inner container 50 is generated as the gas filling the tank is adiabatically compressed.

The high-pressure tank 100 in accordance with this embodiment further includes a pipe 60 at the uppermost portion in the high-pressure tank 100 in the vertical direction within the gap 40 in a state in which the high-pressure tank 100 is laid on its side. The pipe 60 is connected at one end to a gas outlet of the first communication channel 22 with the check valve 21 formed in the valve device 20, and is closed at the other end. The pipe 60 has a plurality of through-holes 61 formed therein at regular intervals across its entire length. The through-holes 61 are preferably formed not in the upper and lower faces of the pipe 60 but in opposite side faces of the pipe 60 as shown in FIG. 2.

The inside of the inner container 50 communicates with the second communication channel 24 with the on-off valve 23 of the valve device 20. High-pressure gas stored in the inner container 50 is supplied to a gas consuming portion (not shown) via the second communication channel 24 when the on-off valve 23 is at open position. Gas stored in the high-pressure tank 100 is not particularly limited, and any gas can be stored therein.

Hereinafter, the state of the high-pressure tank 100 when hydrogen gas is stored therein for example, will be described. When a supply nozzle of a filling machine 6 provided in an external hydrogen station 1 is connected to the gas inlet side of the first communication channel 22 formed in the valve device 20 of the high-pressure tank 100, high-pressure hydrogen gas stored in a gas storage 7 is introduced into the high-pressure tank 100. The introduced hydrogen gas flows into the pipe 60, and then fills the gap 40 through the through-holes 61 formed in the pipe 60. The hydrogen gas that has filled the gap 40 enters an internal space 55 of the inner container 50 through the through-holes 54 formed in the inner container 50, and is stored therein. When high-pressure hydrogen gas is continuously supplied from the pipe 60, the pressure of the hydrogen gas stored in the internal space 55 of the inner container 50 gradually increases, and so adiabatic compression is generated. Accordingly, the temperature in the inner container 50 increases, and the temperature of the inner container 50 itself also increases.

Meanwhile, the pressure of hydrogen gas stored in the gas storage 7 provided in the external hydrogen station 1 is higher than the rated maximum reservoir pressure. P (for example, 80 MPa) of the high-pressure tank 100, and the hydrogen gas is cooled (precooled) to about −40° C., for example, within the gas storage 7. The hydrogen gas at high pressure and in a cooled state under such an environment is continuously supplied into the inner container 50 until the rated pressure P is reached.

As the hydrogen gas is continuously supplied, the temperature in the inner container 50 gradually increases due to adiabatic compression of the hydrogen gas supplied. Meanwhile, since the hydrogen gas discharged into the gap 40 from the pipe 60 has been precooled as described above, the outer periphery of the inner container 50 is continuously cooled by the hydrogen gas at a low temperature. Therefore, the inner container 50 can be maintained at a temperature lower than that in the internal space 55. In addition, during the filling process, the inner container 50 already contains hydrogen gas that has been previously transferred thereto, and so hydrogen gas that is transferred later thereto has a lower compression ratio than the previously transferred hydrogen gas. Therefore, the temperature rise due to adiabatic compression within the inner container 50 gradually becomes slow.

Accordingly, in the process of filling the tank with hydrogen gas, the gap 40 formed between the outer periphery of the inner container 50 and the inner periphery of the liner 10 is maintained at a temperature lower than that in the inner container 50. That is, as described above, the surrounding wall of the inner container 50 can serve the function of a temperature partition wall between hydrogen gas at a high temperature within the inner container 50 and hydrogen gas at a lower temperature in the gap 40, and a function of preventing the temperature of the high-temperature gas within the inner container 50 from being easily transferred to the liner 10.

In addition, since the inside of the inner container 50 and the gap 40 are almost at the same pressure during filling, no large force acts on the inner container 50. Therefore; the inner container 50 need not have a high mechanical strength, and can be formed using a thin plate with a thickness enough to retain its shape in the rated temperature environment. The material of the inner container 50 is preferably thin-plate resin that is difficult to allow heat to pass therethrough in order to enhance the function of the adiabatic wall, but may also be a metal plate.

As described above, since the inner container 50 is provided in the high-pressure tank 100, portions, which contact gas, of the tank reinforcing structures, such as the liner 10 and the fiber-reinforced resin layer 30, can be retained at a temperature of less than or equal to 85° C. even when the temperature in the inner container 50 is greater than or equal to 85° C., for example. That is, if the maximum rated temperature of the high-pressure tank 100 when it is filled with gas is 85° C., the liner 10 can be retained at a temperature of less than or equal to 85° C. even when the temperature in the inner container 50 that occupies a large internal space of the tank becomes greater than or equal to 85° C. This means that the precool temperature of hydrogen gas to fill the tank can be alleviated to a higher temperature side, which can also reduce the cost on the hydrogen station 1 side.

In the current standards (GTR No. 13, SAEJ 2579, and SAEJ 2601), the maximum temperature of a high-pressure hydrogen container when it is filled with gas is defined as 85° C., and the type of the container (liner) is defined as a metal liner or a resin liner. Even when a resin liner with low thermal conductivity and low heat radiation performance is used, in order to rapidly fill the container with gas in three minutes and keep the upper limit of the container (liner) at 85° C., it is necessary to cool (precool) the gas to fill the container to about −40° C. in advance as described above. Meanwhile, when a metal liner is used, such an objective can be achieved by cooling (precooling) the gas to about −20° C. However, since a resin liner is superior in mass efficiency to a metal liner, the use of the resin liner is recommended when this type of high-pressure tank is used for vehicles for example.

As described above, when the high-pressure tank 100 is used, it is possible to use a resin liner with excellent mass efficiency and reduce the cost by setting the precool temperature of hydrogen gas on the hydrogen station side to about −20° C.

Specifically, in the high-pressure tank 100 shown in FIGS. 1 and 2, hydrogen gas introduced into the high-pressure tank 100 is guided into the pipe 60 located in the uppermost portion of the high-pressure tank 100 in the vertical direction when the tank is laid on its side, and the gas is distributed in the direction of the peripheral surface of the inner container 50 from the through-holes 61 formed in the pipe 60. The distributed hydrogen gas is introduced into the inner container 50 through the through-holes 54 formed in the lower face of the inner container 50 in the vertical direction. When the hydrogen gas that fills the tank is used, the gas is discharged to a hydrogen-gas consuming portion from the second communication channel 24 with the on-off valve 23.

As described above, the temperature of the hydrogen gas introduced into the high-pressure tank 100 is lower (and the density is higher) than that in the inner container 50. Therefore, after the gas has come out of the pipe 60, the gas drops in the direction of the periphery along the outer periphery of the inner container 50 due to the negative buoyancy resulting from the gravity. Accordingly, even though the temperature in the inner container 50 rises due to heat of compression during filling, the outer periphery of the inner container 50 can be maintained at a temperature that is surely lower than the temperature in the inner container 50 (<85° C., for example).

In addition, the temperature of hydrogen gas within the inner container 50 after the filling is always higher than that outside the inner container 50. Therefore, there is no possibility that the hydrogen gas will escape to the outside of the inner container 50 from the through-holes 54 in the lower face of the inner container 50 due to the buoyancy, and there is also no possibility that the high-temperature gas within the inner container 50 will be directly in contact with the inner periphery of the liner 10 even after the filling. Further, as described above, since the surrounding wall of the inner container 50 and the gap 40 function as heat-insulating layers, the temperature of the inner container 50 is significantly alleviated and is transferred to the wall surface of the liner 10.

After the filling, even when the hydrogen gas is used for driving a vehicle, for example, there is still no possibility that the hydrogen gas at a high temperature within the inner container 50 will be in contact with the inner periphery of the liner 10 since the hydrogen gas is directly discharged from the inner container 50 through the second communication channel 24 of the valve device 20. Therefore, the temperature of the liner 10 does not rise even when the gas is discharged. Further, since the gas within the inner container 50 is discharged through the valve device 20 made of metal, absorption and radiation of heat progress in the valve device 20, and so there is no possibility that high-temperature gas (of over 85° C.) will flow to the downstream side of the tank, that is, to the outside of the tank.

Figure 3:
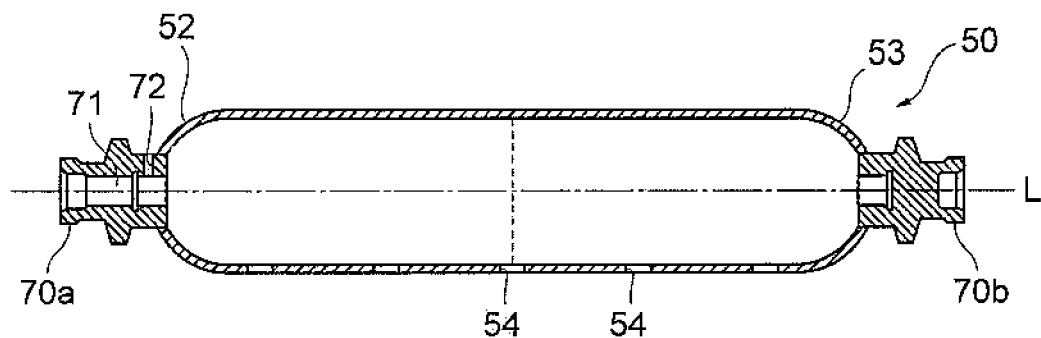
FIG. 3 is a first view of an exemplary method for producing a high-pressure tank.

FIGS. 3 to 6 show an exemplary method for producing the high-pressure tank 100 shown in FIGS. 1 and 2. First, as shown in FIG. 3, the inner container 50 is molded, and then, a first mouthpiece 70a is attached to the center of the first dome portion 52. In addition, a second mouthpiece 70b is attached to the center of the second dome portion 53. The first mouthpiece 70a and the second mouthpiece 70b are disposed such that they have a common central axis line L. The first mouthpiece 70a has a through-hole 71 in the axis line direction and a vertical hole 72, which communicates with the outside of the first mouthpiece 70a, formed in a part of the through-hole 71 in the vertical direction of the central axis line L. Meanwhile, the second mouthpiece 70b does not have a through-hole therein. As shown in FIG. 3, an appropriate number of through-holes 54 are formed in the bottom of the inner container 50 in the vertical direction when the central axis line L is oriented in the horizontal direction. The inner container 50 may also be formed by joining members, which have been split in two or three at appropriate portions in the central axis line L direction, together.

Figure 4:
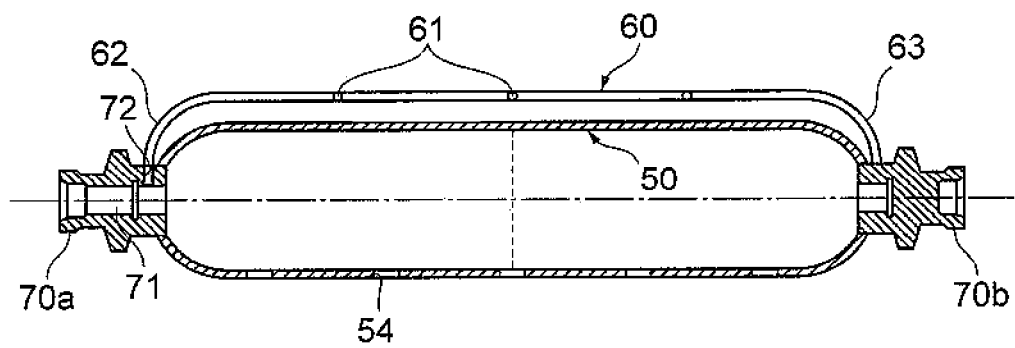
FIG. 4 is a second view of an exemplary method for producing a high-pressure tank.

Next, as shown in FIG. 4, the pipe 60 is attached in parallel with the central axis line L. The pipe 60 is attached such that one end 62 thereof communicates with the vertical hole 72 formed in the first mouthpiece 70a. In addition, the other end 63 is connected to a part of the second mouthpiece 70b.

Next, the liner 10 is attached to the outer side of the inner container 50. For attachment, the liner 10, which has been split in two in the vertical direction along the direction of the central axis line L, is prepared. Then, with an opening of one part 10a of the split liner positioned on the right side, the part is moved from left to right in FIG. 5, and in a posture where the center of the first dome portion 12 abuts the left portion of the first mouthpiece 70a, the two are integrally joined together. Meanwhile, with an opening of the other part 10b of the split liner positioned on the left side, the part is moved from right to left in FIG. 5, and in a posture where the center of the second dome portion 13 abuts the right portion of the second mouthpiece 70b, the center of the second dome portion 13 and the second mouthpiece 70b are integrated with each other. In such a posture, open edges of the one part 10a and the other part 10b of the split liner are butt-joined together. Therefore, the two edges are integrally joined together through welding or the like.

Figure 5:
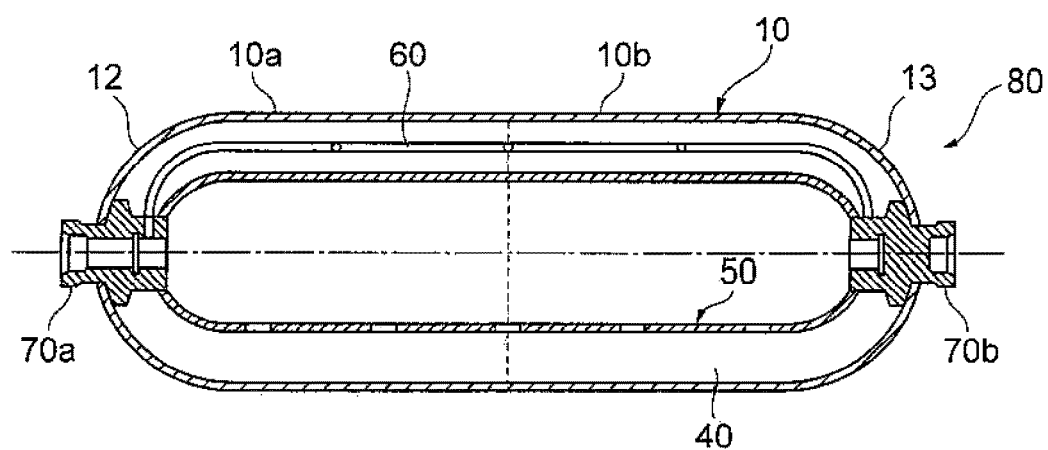
FIG. 5 is a third view of an exemplary method for producing a high-pressure tank.

Accordingly as shown in FIG. 5, a structure 80 is obtained that has at its opposite ends in the longitudinal direction the first mouthpiece 70a and the second mouthpiece 70b having a common central axis line L, and also has the inner container 50 and the liner 10 on the inner side and the outer side, respectively, between the first mouthpiece 70a and the second mouthpiece 70b. In addition, the gap 40 is formed between the inner container 50 and the liner 10, and a single pipe 60 that extends axially is located in the gap 40.

Figure 6:
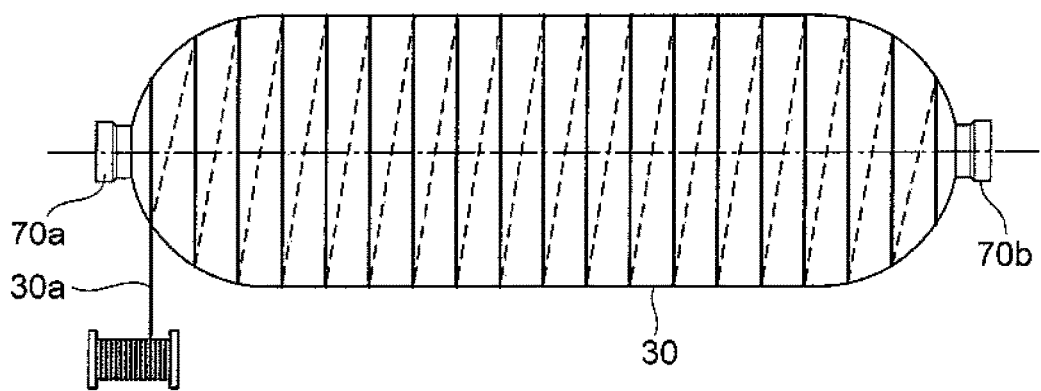
FIG. 6 is a fourth view of an exemplary method for producing a high-pressure tank.

Next, as shown in FIG. 6, fiber-reinforced resin 30a is wound on the structure 80 through so-called film winding while an appropriate rotary drive force is applied to the first mouthpiece 70a and the second mouthpiece 70b of the structure 80 and the structure 80 is rotated, so that the fiber-reinforced resin layer 30 is formed.

Finally, the valve device 20 including the first communication channel 22 with the check valve 21 and the second communication channel 24 with the on-off valve 23 shown in FIG. 1 is attached using the through-hole 71 formed in the first mouthpiece 70a. At this time, connection is carried out such that an open end of the first communication channel 22 communicates with the vertical hole 72 formed in the first mouthpiece 70a, and an open end of the second communication channel 24 communicates with the internal space 55 of the inner container 50. Accordingly, the high-pressure tank 100 shown in FIG. 1 is completed. It should be noted that as described above, in FIG. 1, the first mouthpiece 70a and the second mouthpiece 70b are not shown for simplicity.

Second Embodiment

Figure 7:
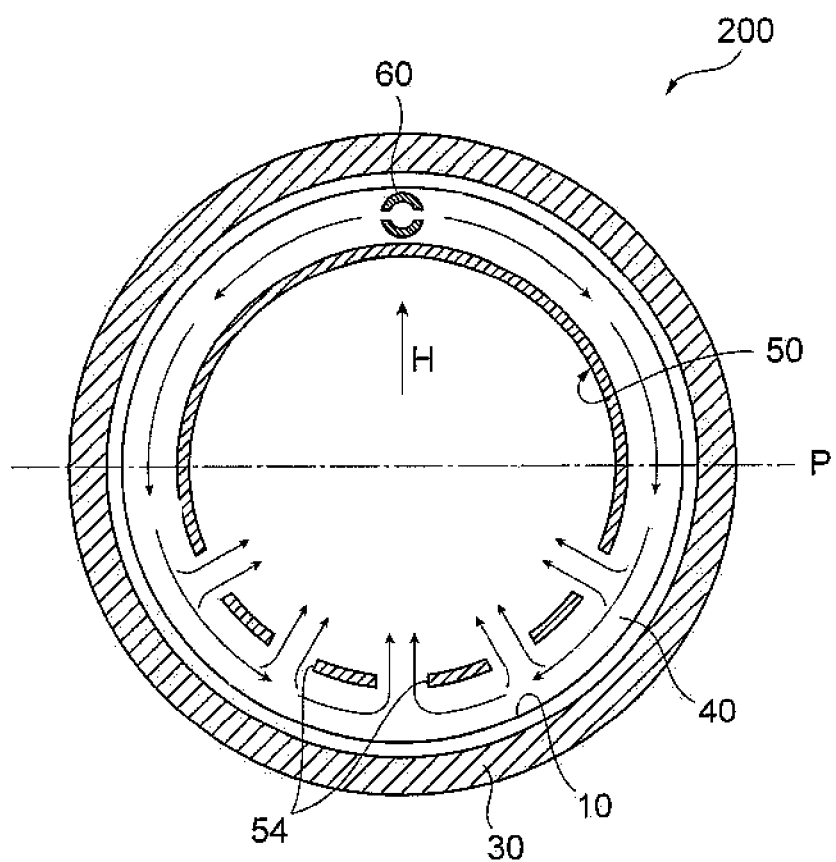
FIG. 7 is a cross-sectional view of another embodiment of a high-pressure tank along a direction orthogonal to its central axis line.

FIG. 7 shows another embodiment of a high-pressure tank. FIG. 7 is a cross-sectional view corresponding to FIG. 2 showing the cross-section of the high-pressure tank 100 of the first embodiment. The high-pressure tank 200 shown in FIG. 7 has a different configuration from the high-pressure tank 100 of the first embodiment in that the through-holes 54 in the inner container 50 are not only formed in the lowermost portion of the inner container 50 in the vertical direction like the high-pressure tank 100 of the first embodiment shown in FIG. 1 but are also dispersed across the entire region at a level lower than the central line P of the inner container 50 in the vertical direction when the high-pressure tank 200 is laid on its side. The other configurations are the same as those of the high-pressure tank 100 of the first embodiment, and the same members are denoted by the same reference numerals. The high-pressure tank 200 in this embodiment is advantageous in that the time for filling the inner container 50 with gas can be shortened as compared to that for the high-pressure tank 100 of the first embodiment shown in FIGS. 1 and 2.

Third Embodiment

Figure 8:
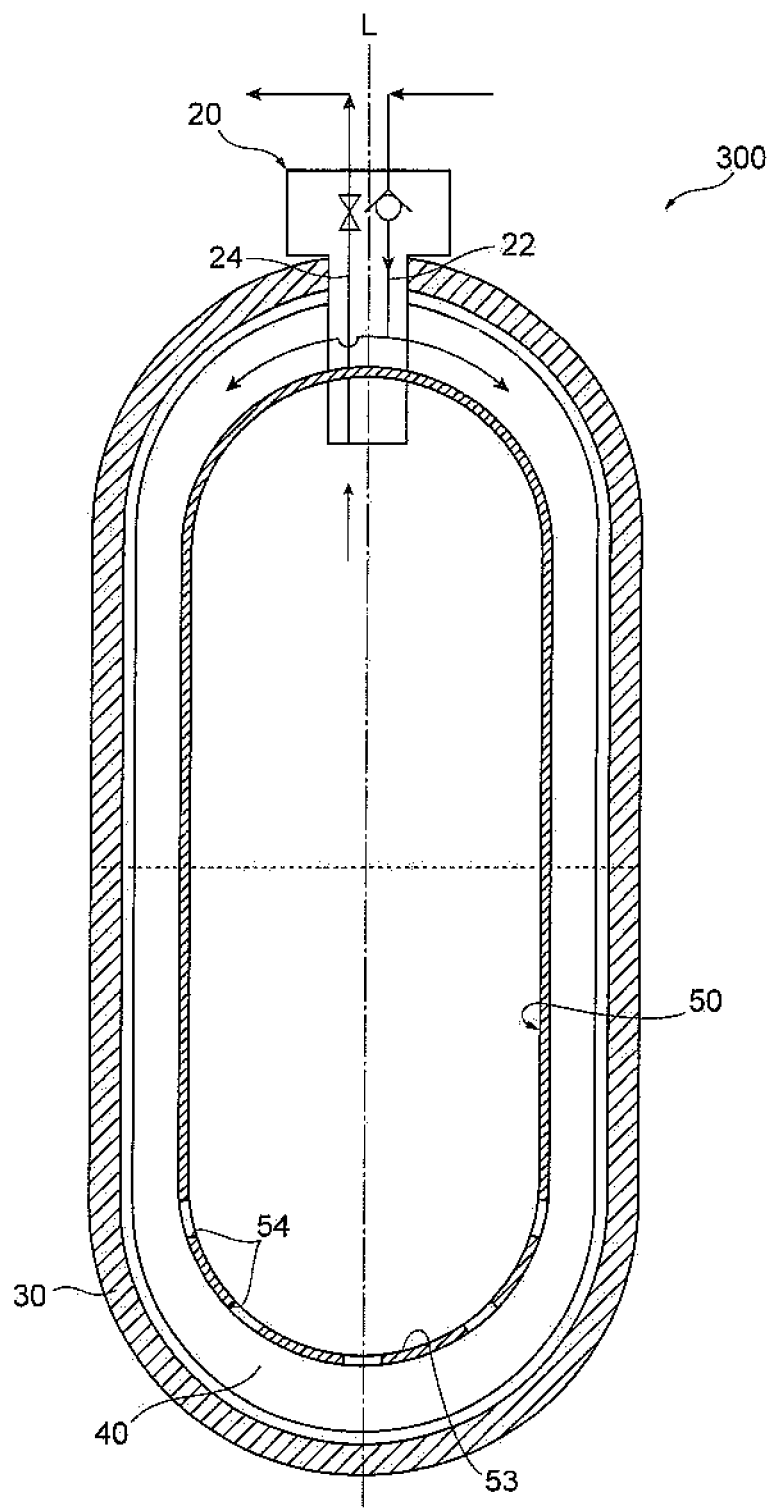
FIG. 8 is a cross-sectional view of further another embodiment of a high-pressure tank along its central axis line.

FIG. 8 shows the cross-section of a high-pressure tank 300 of a third embodiment along its central axis line L. The high-pressure tank 300 shown in FIG. 8 differs from the high-pressure tank 100 of the first embodiment in that the high-pressure tank 300 does not have the pipe 60; the through-holes 54 in the inner container 50 are formed in an end region of the inner container 50 on the side opposite to an end at which the valve device 20 is attached, that is, in the aforementioned second dome portion 53; the valve device 20 has two or more gas outlets of the first communication channel 22 with the check valve 21; and the gas outlets are formed radially around the central axis line L. The other configurations are the same as those of the high-pressure tank 100 of the first embodiment, and the same members are denoted by the same reference numerals.

The high-pressure tank 300 in this embodiment can also obtain the same operational effects of the high-pressure tank 100 of the first embodiment. The high-pressure tank 300 is particularly effective when it is disposed such that its central axis line L is oriented vertically, that is, when the high-pressure tank 300 is disposed vertically.

Other Embodiments

The high-pressure tank 100 of the first embodiment shown in FIGS. 1 and 2 can also have attached thereto two or more pipes 60 arranged in parallel.

[Results of Simulation]

Next, the advantageous effects of the high-pressure tank 100 of the first embodiment shown in FIGS. 1 and 2 will be described with reference to the results of simulation of filling the tank with gas conducted by the inventors based on generation of heat and radiation of heat to the outside that occur due to adiabatic compression of gas.

1. Filling Conditions

The gas filling conditions were set as follows.

The ambient temperature: 40° C., the pressure increase rate within the tank: 28.5 MPa/minute, the filling time: 167 seconds (time required to increase the pressure from 1 MPa to 80 MPa), the type of the container (the liner 10 and the inner container 50): resin.

2. Results 2-1. In the Case of the Conventional Tank.

A case where the conventional tank, that is, a high-pressure tank without the inner container 50 and the pipe 60 of the high-pressure tank 100 of the first embodiment shown in FIGS. 1 and 2 is used will be described.

The temperature of gas, which has been precooled to −30° C. and then caused to fill the tank in a high-pressure state of up to 80 MPa, was 85° C.

The temperature of gas, which has been precooled to −5° C. and then caused to fill the tank in a high-pressure state of up to 80 MPa, was 109° C.

2-2. In the Case of the High-Pressure Tank in Accordance with the Present Disclosure A case where the high-pressure tank 100 shown in FIGS. 1 and 2 is used will be described. Specifically, the materials of the inner container 50 and the liner 10: high-density polyethylene, the plate thickness of the inner container 50: 2 mm, the thickness of the gap 40: 5 mm, the gas to fill the tank: hydrogen, and the physical properties of the hydrogen gas a thermal conductivity of 0.214 W/mK, a specific heat of 14486 kg/m$^3$, a density within the inner container 50 of 36.7 kg/m$^3$ (at a pressure in the container of 80 MPa).

The results of simulation conducted under the aforementioned conditions were such that the temperature of gas, which has been precooled to −5° C. and caused to fill the tank under a high-pressure state of up to 80 MPa, was 114° C. in the inner container 50 and 84° C. in the gap 40.

2-3. Evaluation.

As is obvious from the results of 2-2, it is found that when the high-pressure tank in accordance with the present disclosure is used, although the type of the container is resin (high-density polyethylene), gas in the gap 40 can be maintained at a temperature of less than or equal to 85° C. (84° C.) even when the gas has been precooled to a temperature of −5° C. It is also found that although the temperature in the inner container 50 is 114° C., the temperature in the inner container 50 is significantly alleviated and transferred to the wall surface of the liner 10 since the surrounding wall of the inner container 50 and the gap 40 function as heat insulating materials or heat insulating layers. Further, it is also found that even when gas has been precooled to a temperature of −5° C., the liner 10 made of resin can be retained at a temperature of less than or equal to a specified value (less than or equal to 85° C.), and so, the volume efficiency of the tank can be increased and the cost on the hydrogen station side can be reduced.

DESCRIPTION OF SYMBOLS 100, 200, 300 High-pressure tanks
10 Liner
10a, 10b Parts of split liner
11 Body of liner
12 First dome portion of liner
13 Second dome portion of liner
20 Valve device
22 First communication channel of valve device
24 Second communication channel of valve device
30 Fiber-reinforced resin layer
30a Fiber-reinforced resin
40 Gap formed between inner periphery of liner and outer periphery of inner container
50 Inner container
51 Body of inner container
52 First dome portion of inner container
53 Second dome portion of inner container
54 Through-hole formed in lowermost portion of inner container in vertical direction
60 Pipe disposed in gap 40
61 Through-hole formed in pipe
70a First mouthpiece
70b Second mouthpiece
71 Through-hole of first mouthpiece
72 Vertical hole formed in first mouthpiece

What is claimed is:

1. A high-pressure tank comprising at least:
a liner adapted to suppress permeation of gas;
a valve device adapted to allow an inside of the liner and an outside of the tank to communicate with each other and block communication therebetween;
an inner container disposed within the liner such that a gap is formed between the inner container and an inner periphery of the liner; and
a through-hole formed in the inner container,
wherein:
the valve device includes
a first communication channel through which the gap formed between the liner and the inner container communicates with the outside of the tank, and through which gas is supplied to the gap from the outside of the tank, and
a second communication channel through which an inside of the inner container communicates with the outside of the tank, and through which gas is discharged to the outside of the tank from the inside of the inner container,
wherein the through-hole formed in the inner container is formed in a region lower than a central plane of the inner container in a vertical direction,
the first communication channel of the valve device connects with a pipe extending in the gap formed between the liner and the inner container,
the pipe has a plurality of holes therein, and
the pipe is located at a top in a vertical direction of the liner.

2. The high-pressure tank according to claim 1, wherein the gas is hydrogen gas.

3. The high-pressure tank according to claim 1, wherein the liner and the inner container contain an identical material.

4. The high-pressure tank according to claim 3, wherein the identical material is a resin material.

* * * * *